May 30, 1939.  L. T. E. THOMPSON ET AL  2,160,006
TIME RECORDING DEVICE
Filed March 24, 1934   2 Sheets-Sheet 1
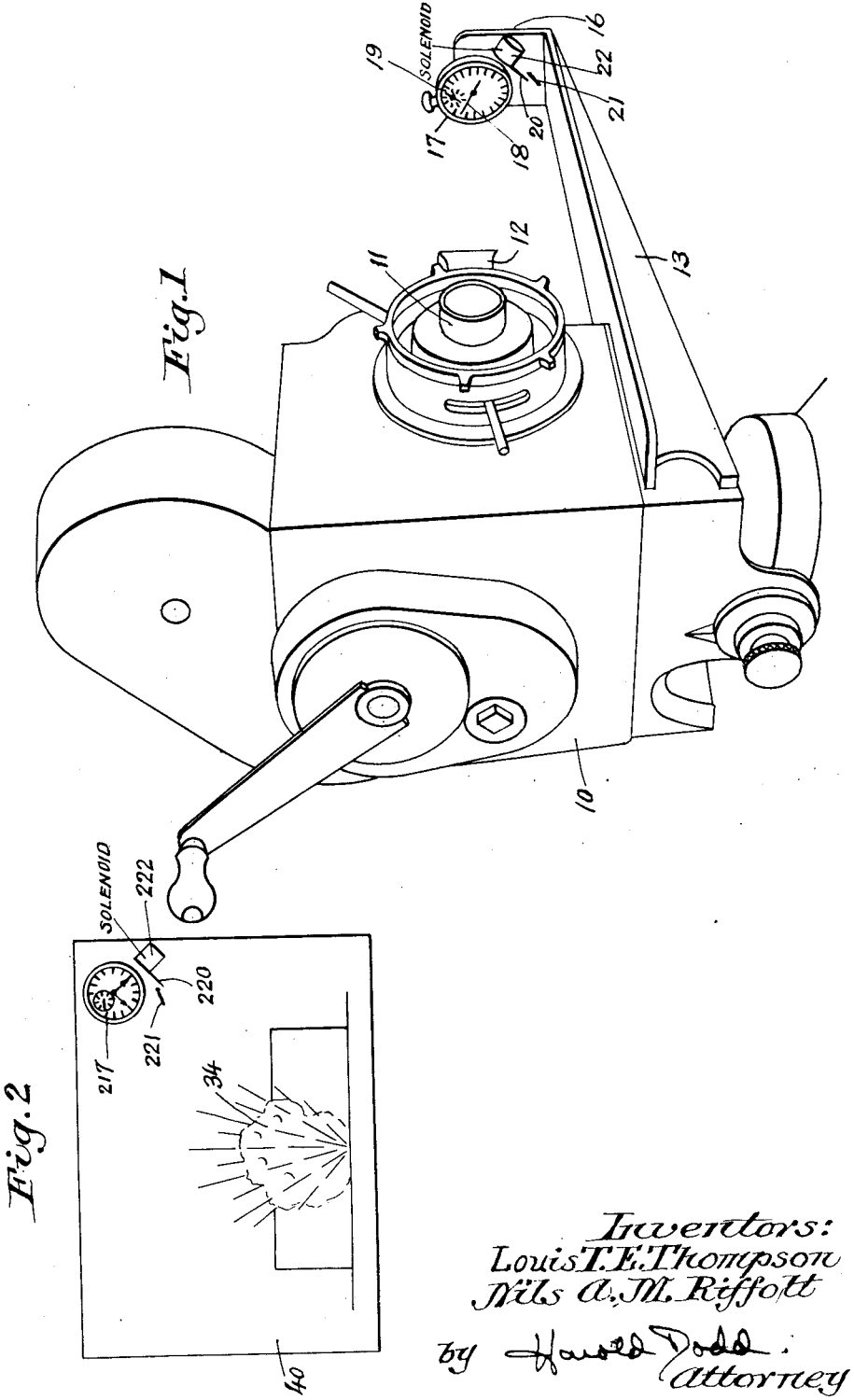

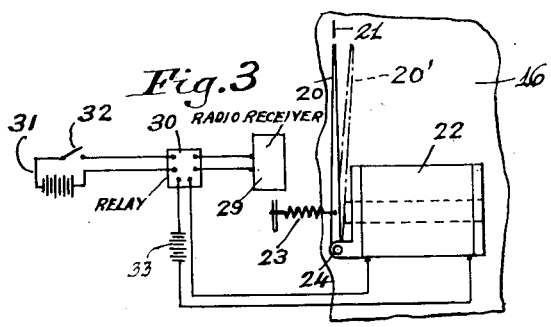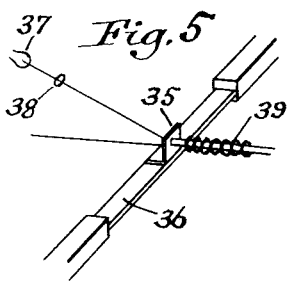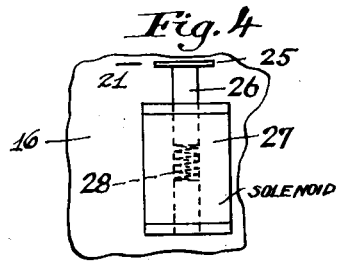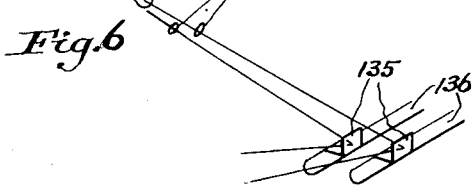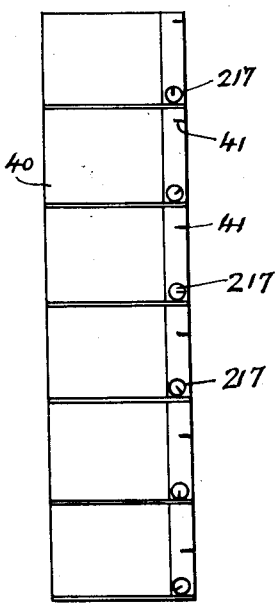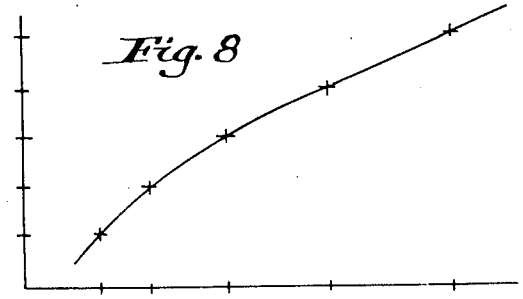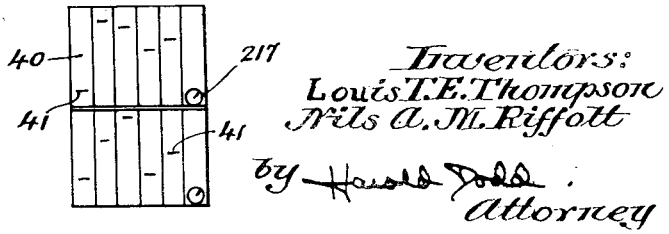

Patented May 30, 1939

2,160,006

UNITED STATES PATENT OFFICE 2,160,006

TIME RECORDING DEVICE

Louis T. E. Thompson and Nils A. M. Riffolt, Dahlgren, Va.

Application March 24, 1934, Serial No. 717,190

2 Claims. (Cl. 234—36.5)

(Granted under the act of March 3, 1883, as amended April 30, 1928; 370 O. G. 757)

This invention relates to devices for recording the time of occurrence of an event or of a phase of an event, and particularly in such cases as involve times so long that the known types of chronographs can not be used.

It is the object of this invention to provide means for making an accurate record of the time of occurrence of an event or a particular phase thereof and particularly to make the time record upon a photograph of such event or of one or more phases thereof.

In the drawings:

Fig. 1 is a perspective view of a moving picture camera provided with one form of time indicating means as contemplated by our invention;

Fig. 2 is a representation of one frame of a moving picture film whereon is recorded an instantaneous phase of the burst of an explosive missile together with the time thereof;

Fig. 3 is a schematic diagram of apparatus for actuating a portion of the time recording means;

Fig. 4 is an alternative form of solenoid-actuated index;

Figs. 5 and 6 are fragmentary detail views of apparatus for utilizing a beam of light whereof the path, after reflection is a function of a time phase of an event, to record a time identifying indicium on a film instead of certain elements shown in Fig. 1;

Fig. 7 illustrates one type of record produced by the device of Fig. 5;

Fig. 8 illustrates a chronographic curve plotted from the data in Fig. 7;

Fig. 9 shows a film upon which no external field appears but a plurality of parallel series of light-recorded indicia occupy the entirety thereof.

Moving picture camera 10, which should be of the high speed type in cases that make desirable a very close study of the instantaneous phases of an event, has a main lens system 11 that would normally cover the entire field of a film in operative position with respect thereto, and an auxiliary lens system in a housing 12 extending transversely to the axis of the system 11. Such auxiliary lens system may be like that illustrated by the elements 161 to 164 of the patent to Rumpel, 2,045,414. The effect upon the film of the auxiliary system is restricted to the desired area by suitable shielding, which also blanks off that area from light that passes through the main system, in a manner well known and therefore not illustrated.

An arm 13, rigidly fixed at one end to camera 10, has its free end upturned as indicated at 16 to serve as a mounting for certain instruments next to be described, the length and position of the arm being such that the instruments mounted on the upturned end are in focus in the auxiliary lens system.

One of the instruments above mentioned is a time piece of any suitable kind designated generally by 17 having a second hand 18 and a minute hand 19, the calibration in seconds being on as large scale as is convenient, to make possible the reading of the time in small fractions of a second. The minute hand indicates the total elapsed time between any two exposures not necessarily consecutive where the time between such exposures is measurable in minutes. Adjacent to time piece 17 is an index 20 movable with respect to a mark 21 to show the timing interval. As shown in Figs. 1–3, the index is a light pointer that is drawn toward solenoid 22 when the latter is energized and is moved away therefrom into registry with mark 21 when no current is flowing in the solenoid. The index may be resilient, have one end fixed and have a permanent set that moves it away from the solenoid when not attracted thereby or it may be rigid, have one end pivoted as at 24, and be moved by a separate spring 23 as shown in Fig. 3. The index may be a piece 25 fixed to the end of a core 26 movable in solenoid 27, as shown in Fig. 4; the core is normally moved outwardly by a spring 28 that tends to hold it with its magnetic center away from the center of the field of the solenoid and is drawn inwardly when the solenoid is energized, the index 25 coinciding with fixed line 21 when in its outermost position. It is important that all the moving parts of the system be of light weight and low inertia that they may respond without significant delay to changes in the forces acting upon them. The position of the movable index is an indicium as to whether the time indicated by the time piece is significant with respect to the event being observed.

Fig. 3 shows schematically the arrangement used for one application of our invention, viz., observing times of fall and trajectory characteristics of bombs dropped from airplanes. The radio receiver 29 is connected to a double relay 30 that is energized by battery 31 controlled by switch 32. The relay 30 closes the circuit between battery 33 and solenoid 22 but it may be operated by current from the receiver 29 also to break that circuit. When an observation is to be taken, the switch is closed which actuates the relay to connect battery 33 to solenoid 22 and the index 20 is thereby drawn to the dotted line position 20', shown in Fig. 3. A short time preceding the release of the bomb the craft from which it is to be dropped sends out a radio signal that is picked up by receiver 29 whereby relay 30 is actuated and caused to open the circuit between battery 33 and solenoid 22, thereby releasing index 20 and permitting it to move again into registry with the mark 21. The end of the radio signal, which may be a dash, coincides with the instant of release of the bomb and allows relay 30 to close the circuit through solenoid 22 which attracts index 20 and holds it in the position 20' throughout the period of observation. The photograph 217 of the timepiece that occurs on each frame will show, as at 220, the time of each movement of index 20, and the elapsed time for each position will be permanently recorded. The photographs of mark 21 and solenoid 22 are indicated by 221 and 222, respectively. The switch 32 may be used alone to effect manual control of the position of index 20 when desired, as when an event is being visually watched by the operator.

In addition to the foregoing, the bomb itself can be photographed while traversing a considerable portion of its path before impact, as well as the impact itself and the concomitant phenomena. It is, of course, to be understood that the use of our invention above set forth is illustrative only and not restrictive. When the initial and final phenomena only of an event are to be studied, a few frames may be taken at the beginning and a few at the the end thereof, the timepiece meanwhile continuing to run to measure the elapsed time.

Fig. 2 illustrates the appearance of the burst 34 of an explosive charge at a time shown by a timepiece at 217. In practice, accurate reading of the time is secured by examining the photograph of the timepiece under a low power microscope.

In Fig. 5 we show the essential elements of another recording system. The mirror 35 is mounted on a tensioned resilient ribbon 36, which may be of spring steel, to receive light from a source 37, through lens 38, and to reflect such light upon the film through auxiliary lens system 12, the image of the source 37 being focused on the film. The mirror 35 is housed in a box mounted in the position in which solenoid 22 is shown that is open toward the lens system only and has a black, non-reflecting interior surface. The solenoid 39 that tilts the mirror may be energized by currents varying in accordance with the phases of an event to be recorded on the film. The maximum change in angle of the mirror between its two extreme positions is such as to cause the beam of light to traverse a distance equal to the width of a frame of film and hence the position of the indicium line on the film caused by the light from mirror 35 will show the angular position of the mirror at the time the frame was exposed.

If desired, the solenoid 39 may be energized by a continuously varying current and thus the beam of light from mirror 35 will strike each frame at a different relative position and these positions, referred to a fixed point that is the same on all frames, may be manually plotted against the respective times shown on each frame and a chronogram curve like that in Fig. 8 be drawn. Fig. 7 shows a film 40 having on it indicia 41 whereof the positions in the successive frames are a function of the angular positions of the mirror when used as above set forth. In Fig. 8 the ordinates are intervals of time and the abscissae are displacements of the recording beam of light from the reference base.

In Fig. 6 is shown a modified form of the recording system disclosed in Fig. 5, using two or more mirrors 135 mounted on tensioned resilient ribbons 136 to receive light from source 137 through lenses 138 each mirror 135 being actuated by an individual solenoid as in Fig. 5, the solenoids being energized in conformity with phases of different aspects of the same event. In Fig. 6, however, the solenoids are not shown, to avoid complication of the drawings. If desired, a number of such mirrors may be employed to make records on a film in juxtaposition to the picture of an external field or the entire film may be occupied by such records to the exclusion of any external field, as indicated in Fig. 9.

The mirrors 35 may be supplanted by any well known oscillographic element, such as the Duddell type, if desired.

The present invention is especially adapted to determination of times so long that the ordinary oscillograph can not be used, as in measuring the interval between the firing of a projectile and the burst thereof or between the dropping of a bomb and its impact upon the target. In fact, regardless of the lapse of time between the beginning and the termination of an event of any kind, the phenomena at each end thereof and any intermediate phases as well can be recorded and the time of occurrence thereof accurately determined. If the rate of motion of the recording surface in the known types of oscillograph be reduced sufficiently to include the time interval comprehended in the series of such occurrences, the order of precision is so reduced as to be unsatisfactory. It will be observed that our invention gives to the time recording mechanism a practically infinite field, since the control of the index 20 by radio signals, as from an aircraft, may be effected from any distance desired and from any direction, and the source of such controlling impulse will usually be far outside the field of the camera lenses.

An example of the use of a film bearing a plurality of series of records, as in Fig. 9, is in recording the time-displacement data of the wave front due to blast effects in firing large caliber guns.

The invention herein described may be manufactured and used by or for the Government of the United States of America for governmental purposes, without the payment of any royalties thereon.

We claim:

1. The combination with a moving picture camera, of an auxiliary lens system disposed to project light to a marginal portion of a film exposure area in said camera, a timepiece and an index mounted in the field of said auxiliary lens system, there being adjacent said index a mark to indicate the normal position of said index; a solenoid, a movable core therein upon the outer end of which said index is carried, means tending to hold said index in said normal position, means to energize said solenoid to move said core against the action of the aforesaid means, and means to control the energization of said solenoid.

2. A photographic timing device, for timing events having several phases only part of which occur within the optical field of said device, comprising in combination a moving picture camera having a film exposure area, a main lens system disposed to project light to the major portion of said exposure area, an auxiliary lens system disposed to project light to a marginal portion of said area, a chronometer adapted to run continuously and an indicating device being adapted to show on said film the occurrence of certain phases of an event at least one of which phases takes place outside the field of said main lens system, said main lens system being adapted to produce on said film a photographic reproduction of at least one phase of said event taking place within the field of said main lens system, the photographic reproductions of said chronometer and said indicating device on the marginal portion of a film providing data for the timing of the various recorded phases of said event both within and without the field of the lens systems of said camera.

LOUIS T. E. THOMPSON.
NILS A. M. RIFFOLT.